(12) United States Patent
Kurian et al.

(10) Patent No.: US 10,977,624 B2
(45) Date of Patent: Apr. 13, 2021

(54) SYSTEM FOR GENERATING PAPER AND DIGITAL RESOURCE DISTRIBUTION DOCUMENTS WITH MULTI-LEVEL SECURE AUTHORIZATION REQUIREMENTS

(71) Applicant: BANK OF AMERICA CORPORATION, Charlotte, NC (US)

(72) Inventors: Manu Jacob Kurian, Dallas, TX (US); Joseph Benjamin Castinado, North Glenn, CO (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 621 days.

(21) Appl. No.: 15/485,879

(22) Filed: Apr. 12, 2017

(65) Prior Publication Data

US 2018/0300692 A1 Oct. 18, 2018

(51) Int. Cl.
*G06Q 20/04* (2012.01)
*G06Q 20/02* (2012.01)
*G06Q 20/40* (2012.01)

(52) U.S. Cl.
CPC ......... *G06Q 20/042* (2013.01); *G06Q 20/023* (2013.01); *G06Q 20/40* (2013.01); *G06Q 2220/00* (2013.01)

(58) Field of Classification Search
None
See application file for complete search history.

(56) References Cited

U.S. PATENT DOCUMENTS 5,412,190 A  5/1995 Josephson et al.
6,189,785 B1 2/2001 Lowery
(Continued)

FOREIGN PATENT DOCUMENTS

WO  2012122172 A2  9/2012
WO  2012122174 A1  9/2012
(Continued)

OTHER PUBLICATIONS

International Search Report and Written Opinion for International Application PCT/US2012/048697 dated Oct. 12, 2012.
(Continued)

*Primary Examiner* — Jamie R Kucab
(74) *Attorney, Agent, or Firm* — Michael A. Springs; Moore & Van Allen PLLC; Nicholas C. Russell (57) ABSTRACT

Embodiments of the invention are directed to systems, methods and computer program products for electronic generation of resource distribution documents via system integrated interface on a platform application. A user may input information for generating a digital resource distribution document via system controlled applications within the external platform application. The system may generate the resource distribution document for digital or physical use. Furthermore, the system deploys multi-level security authorization requirements for distribution of resources via the resource distribution documents. In this way, the system encrypts the information inputted into an encrypted scannable code; the system generates a digital photo of the generated document, and stores device information associated with the device that was used to generate the document. This multi-level authorization is reviewed by a receiving institution prior to authorizing deployment of resources from the generated resource distribution document.

14 Claims, 6 Drawing Sheets

(56) References Cited

U.S. PATENT DOCUMENTS

| | | |
|---|---|---|
| 6,243,689 B1 | 6/2001 | Norton |
| 6,554,185 B1 | 4/2003 | Montross et al. |
| 6,996,263 B2 | 2/2006 | Jones et al. |
| 7,016,532 B2 | 3/2006 | Boncyk et al. |
| 7,090,122 B1 | 8/2006 | Warren et al. |
| 7,137,551 B1 | 11/2006 | Crews et al. |
| 7,155,228 B2 | 12/2006 | Rappaport et al. |
| 7,207,478 B1 | 4/2007 | Blackson et al. |
| 7,389,913 B2 | 6/2008 | Starrs |
| 7,403,652 B2 | 7/2008 | Boncyk et al. |
| 7,412,081 B2 | 8/2008 | Doi |
| 7,424,303 B2 | 9/2008 | Al-Sarawi |
| 7,477,780 B2 | 1/2009 | Boncyk et al. |
| 7,526,280 B2 | 4/2009 | Jung |
| 7,564,469 B2 | 7/2009 | Cohen |
| 7,565,008 B2 | 7/2009 | Boncyk et al. |
| 7,680,324 B2 | 3/2010 | Boncyk et al. |
| 7,702,588 B2 | 4/2010 | Gilder et al. |
| 7,775,437 B2 | 8/2010 | Cohen |
| 7,792,738 B2 | 9/2010 | Channell |
| 7,814,336 B1 | 10/2010 | Nisbet et al. |
| 7,840,456 B2 | 11/2010 | Patzer |
| 7,881,529 B2 | 2/2011 | Boncyk et al. |
| 7,899,243 B2 | 3/2011 | Boncyk et al. |
| 7,899,252 B2 | 3/2011 | Boncyk et al. |
| 7,912,785 B1 | 3/2011 | Kay |
| 8,045,784 B1 | 10/2011 | Price et al. |
| 8,104,674 B2 | 1/2012 | Smith et al. |
| 8,138,930 B1 | 3/2012 | Heath |
| 8,195,570 B1 | 6/2012 | Barron et al. |
| 8,255,278 B1 | 8/2012 | Young et al. |
| 8,290,237 B1 | 10/2012 | Burks et al. |
| 8,332,329 B1 | 12/2012 | Thiele |
| 8,385,950 B1 | 2/2013 | Wagner et al. |
| 8,401,904 B1 | 3/2013 | Simakov et al. |
| 8,438,110 B2 | 5/2013 | Calman et al. |
| 8,474,704 B1 | 7/2013 | Grimm et al. |
| 8,583,492 B2 | 11/2013 | Connell |
| 8,626,662 B2 | 1/2014 | Pinski |
| 8,639,621 B1 | 1/2014 | Ellis et al. |
| 8,714,336 B2 | 5/2014 | Csulits et al. |
| 9,002,749 B1 | 4/2015 | Thiele |
| 9,025,851 B2 | 5/2015 | Smith et al. |
| 9,031,308 B2 | 5/2015 | Sandoz et al. |
| 9,171,296 B1 | 10/2015 | Kurian |
| 9,355,391 B2 | 5/2016 | von Behren et al. |
| 2002/0013728 A1 | 1/2002 | Wilkman |
| 2002/0026423 A1 | 2/2002 | Maritzen et al. |
| 2002/0042773 A1 | 4/2002 | Fugitte et al. |
| 2002/0073025 A1 | 6/2002 | Tanner et al. |
| 2002/0152179 A1 | 10/2002 | Racov |
| 2003/0064705 A1 | 4/2003 | Desiderio |
| 2004/0021584 A1 | 2/2004 | Hartz, Jr. et al. |
| 2004/0024709 A1 | 2/2004 | Yu et al. |
| 2004/0111370 A1 | 6/2004 | Saylors et al. |
| 2006/0049242 A1 | 3/2006 | Mejias et al. |
| 2006/0074799 A1 | 4/2006 | Averyt et al. |
| 2006/0074803 A1 | 4/2006 | Crowell et al. |
| 2006/0100951 A1 | 5/2006 | Mylet et al. |
| 2006/0144923 A1 | 7/2006 | VanKirk et al. |
| 2007/0094095 A1 | 4/2007 | Kilby |
| 2007/0140595 A1 | 6/2007 | Taylor et al. |
| 2007/0175977 A1 | 8/2007 | Bauer et al. |
| 2007/0278290 A1 | 12/2007 | Messerges et al. |
| 2008/0021803 A1 | 1/2008 | Ahles et al. |
| 2008/0040278 A1 | 2/2008 | DeWitt |
| 2008/0109324 A1 | 5/2008 | Rosmarin et al. |
| 2008/0147561 A1 | 6/2008 | Euchner et al. |
| 2008/0214210 A1 | 9/2008 | Rasanen et al. |
| 2008/0245854 A1 | 10/2008 | Monden |
| 2008/0268876 A1 | 10/2008 | Gelfand et al. |
| 2008/0307307 A1 | 12/2008 | Ciudad et al. |
| 2009/0005010 A1 | 1/2009 | Dote et al. |
| 2009/0094125 A1 | 4/2009 | Killian et al. |
| 2009/0102859 A1 | 4/2009 | Athsani et al. |
| 2009/0140839 A1 | 6/2009 | Bishop et al. |
| 2009/0144164 A1 | 6/2009 | Wane et al. |
| 2009/0171850 A1 | 7/2009 | Yuval |
| 2009/0182748 A1 | 7/2009 | Walker |
| 2009/0185241 A1 | 7/2009 | Nepomniachtchi |
| 2009/0192903 A1 | 7/2009 | Weiss et al. |
| 2009/0204511 A1 | 8/2009 | Tsang |
| 2009/0250515 A1 | 10/2009 | Todd et al. |
| 2009/0254447 A1 | 10/2009 | Blades |
| 2009/0327133 A1 | 12/2009 | Aharoni et al. |
| 2010/0078471 A1 | 4/2010 | Lin et al. |
| 2010/0122216 A1 | 5/2010 | Song et al. |
| 2010/0125510 A1 | 5/2010 | Smith et al. |
| 2010/0185529 A1 | 7/2010 | Chesnut et al. |
| 2010/0228624 A1 | 9/2010 | Morris et al. |
| 2010/0250581 A1 | 9/2010 | Chau |
| 2010/0316204 A1 | 12/2010 | Loeb et al. |
| 2011/0022540 A1 | 1/2011 | Stern et al. |
| 2011/0034176 A1 | 2/2011 | Lord et al. |
| 2011/0091092 A1 | 4/2011 | Nepomniachtchi et al. |
| 2011/0106845 A1 | 5/2011 | Lipson et al. |
| 2011/0119155 A1 | 5/2011 | Hammad et al. |
| 2011/0202466 A1 | 8/2011 | Carter |
| 2011/0280450 A1 | 11/2011 | Nepomniachtchi et al. |
| 2011/0320325 A1 | 12/2011 | Preston et al. |
| 2012/0158584 A1 | 6/2012 | Behren et al. |
| 2012/0166333 A1 | 6/2012 | von Behren et al. |
| 2012/0179609 A1 | 7/2012 | Agarwal et al. |
| 2012/0203632 A1 | 8/2012 | Blum et al. |
| 2012/0229624 A1 | 9/2012 | Calman et al. |
| 2012/0229625 A1 | 9/2012 | Calman et al. |
| 2012/0229647 A1 | 9/2012 | Calman et al. |
| 2012/0229657 A1 | 9/2012 | Calman et al. |
| 2012/0230538 A1 | 9/2012 | Calman et al. |
| 2012/0230539 A1 | 9/2012 | Calman et al. |
| 2012/0230540 A1 | 9/2012 | Calman et al. |
| 2012/0230548 A1 | 9/2012 | Calman et al. |
| 2012/0230557 A1 | 9/2012 | Calman et al. |
| 2012/0230577 A1 | 9/2012 | Calman et al. |
| 2012/0231424 A1 | 9/2012 | Calman et al. |
| 2012/0231425 A1 | 9/2012 | Calman et al. |
| 2012/0231814 A1 | 9/2012 | Calman et al. |
| 2012/0231840 A1 | 9/2012 | Calman et al. |
| 2012/0232937 A1 | 9/2012 | Calman et al. |
| 2012/0232954 A1 | 9/2012 | Calman et al. |
| 2012/0232966 A1 | 9/2012 | Calman et al. |
| 2012/0232968 A1 | 9/2012 | Calman et al. |
| 2012/0232976 A1 | 9/2012 | Calman et al. |
| 2012/0232977 A1 | 9/2012 | Calman et al. |
| 2012/0232993 A1 | 9/2012 | Calman et al. |
| 2012/0233003 A1 | 9/2012 | Calman et al. |
| 2012/0233005 A1 | 9/2012 | White |
| 2012/0233015 A1 | 9/2012 | Calman et al. |
| 2012/0233025 A1 | 9/2012 | Calman et al. |
| 2012/0233032 A1 | 9/2012 | Calman et al. |
| 2012/0233033 A1 | 9/2012 | Calman et al. |
| 2012/0233070 A1 | 9/2012 | Calman et al. |
| 2012/0233072 A1 | 9/2012 | Calman et al. |
| 2012/0233089 A1 | 9/2012 | Calman et al. |
| 2013/0033522 A1 | 2/2013 | Calman et al. |
| 2013/0036050 A1 | 2/2013 | Giordano et al. |
| 2013/0132219 A1 | 5/2013 | Liberty |
| 2013/0155474 A1 | 6/2013 | Roach et al. |
| 2013/0191227 A1 | 7/2013 | Pasa et al. |
| 2013/0218721 A1 | 8/2013 | Borhan et al. |
| 2013/0246199 A1 | 9/2013 | Carlson |
| 2013/0246260 A1 | 9/2013 | Barten et al. |
| 2013/0246261 A1 | 9/2013 | Purves et al. |
| 2013/0254115 A1 | 9/2013 | Pasa et al. |
| 2013/0256403 A1 | 10/2013 | MacKinnon Keith |
| 2013/0317928 A1 | 11/2013 | Laracey |
| 2013/0325667 A1 | 12/2013 | Satyavolu et al. |
| 2013/0325681 A1 | 12/2013 | Somashekar et al. |
| 2014/0067661 A1* | 3/2014 | Elischer ............... G06Q 20/042 705/39 |

(56) References Cited

U.S. PATENT DOCUMENTS

| | | | |
|---|---|---|---|
| 2015/0088740 A1* | 3/2015 | Doyle | G06Q 20/108 |
| | | | 705/42 |
| 2015/0278819 A1* | 10/2015 | Song | G06Q 20/042 |
| | | | 705/45 |
| 2016/0026999 A1 | 1/2016 | Kurian | |
| 2016/0117750 A1 | 4/2016 | Calman et al. | |
| 2016/0162960 A1 | 6/2016 | Calman et al. | |
| 2016/0162964 A1 | 6/2016 | Calman et al. | |
| 2016/0162982 A1 | 6/2016 | Calman et al. | |
| 2016/0163000 A1 | 6/2016 | Calman et al. | |
| 2016/0171306 A1 | 6/2016 | Calman et al. | |
| 2016/0267506 A1 | 9/2016 | Calman et al. | |
| 2016/0267507 A1 | 9/2016 | Calman et al. | |
| 2017/0076402 A1* | 3/2017 | Davis | G06Q 20/042 |

FOREIGN PATENT DOCUMENTS

| | | | |
|---|---|---|---|
| WO | 2012122184 A1 | 9/2012 | |
| WO | 2012122235 A1 | 9/2012 | |
| WO | 2012122248 A1 | 9/2012 | |
| WO | 2013019674 A1 | 2/2013 | |

OTHER PUBLICATIONS

International Preliminary Report on Patentability for International Application PCT/US2012/048697 dated Feb. 13, 2014.
International Search Report and Written Opinion for International Application PCT/US2012/028036 dated Jun. 4, 2012.
International Preliminary Report on Patentability for International Application PCT/US2012/028036 dated Sep. 19, 2013.
International Search Report and Written Opinion for International Application PCT/US2012/028008 dated Jun. 4, 2012.
International Preliminary Report on Patentability for International Application PCT/US2012/028008 dated Sep. 19, 2013.
International Search Report and Written Opinion for International Application PCT/US2012/027912 dated Jun. 28, 2012.
International Preliminary Report on Patentability for International Application PCT/US2012/027912 dated Sep. 19, 2013.
International Search Report and Written Opinion for International Application PCT/US2012/027892 dated Jun. 25, 2012.
International Search Report and Written Opinion for International Application PCT/US2012/027890 dated Feb. 5, 2013.
International Preliminary Report on Patentability for International Application PCT/US2012/027890 dated Sep. 19, 2013.

* cited by examiner

SYSTEM FOR GENERATING PAPER AND DIGITAL RESOURCE DISTRIBUTION DOCUMENTS WITH MULTI-LEVEL SECURE AUTHORIZATION REQUIREMENTS

BACKGROUND

With advancements in technology, user resource access and distribution without authorization is becoming easier. As such, third parties may be able to manipulate resource access, deposits, and distribution. Furthermore, paper resource distribution documents have limited amounts of multi-factor authentication.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Paper resource distribution documents have limited amount of multi-factor authentication. Thus, a need exists for an enhanced authentication and security measures for multi-factor paper resource distribution document authentication.

In some embodiments, the invention allows a user to print checks or other resource documents from a home network securely. As such, the invention does away with sets of paper checks. In this way, the system links to a user's online or mobile application and allows a user to generate a paper check on one of those platforms. The platform requires authentication onto the platform for secure generation of the check. The user may input the amount, payee, and the like into the system and the system may generate the check.

Furthermore, the user can input various parameters around the check, such as a time frame until expiration, or the like. Furthermore, the system generates a photo of the completed check and parameters. This photo may be used to reconcile the check at the receiving financial institution to ensure the check has not be tampered with in any way.

The photo is a digital generated image that will contain at least two levels of security. First, a quick response code (QR) that provides encrypted details about the details of the payment such as for example from who, to who, amount, reason, date of remittance, date to remit by, and the like. The second level of security will be hidden from the receiving party, this will include the device the user issuing the check has authorized. For example, the system may only allow digitally generated checks from a user's home computer, active mobile device, and/or the like. Furthermore, the system may add any additional restrictions about the ISP used, mobile carrier used, proximity from my home-safe location where the device issued the user's digital check, and the like. This will assist in misappropriation protection and prevention based on using public access devices or cloned devices across the global from misappropriation to be the user issuing a check. Furthermore, the system may additionally add limits, velocity, and recipients of checks to only registered individuals, amounts less than X dollars, or no more than X amount of checks generated within a time period. These restrictions can be learned behavior of the system based on past check writing and check issuance history of the user.

In some embodiments, the image can then be transmitted to any resource distribution entity or financial institution based on ACH or wire transactions digitally. Cross entity transfers can use the digitally encrypted data to cross check the paper or digital version presented by the check remitter.

These digital checks can furthermore be used for items such as payroll checks, insurance claim disbursements and other recurring or repeating issuing periods.

Embodiments of the invention relate to systems, methods, and computer program products for generating resource distribution documents with multi-level security authorization, the system comprising: identifying a user authorization for access onto a platform application and identifying a device the user is utilizing to access the platform application, wherein the platform application is a mobile or online platform; allowing user input into interface portal within the platform application for resource distribution document generation; generating digital version of the resource distribution document based on the user input; encrypting the user input into an encrypted scannable code that is imprinted on the generated digital version of the resource distribution document; taking a digital photo of the generated digital version of the resource distribution document and store the digital photo; presenting the generated digital version of the resource distribution document to the user via the interface for distribution to a receiving party; receiving an indication that the resource distribution document was presented to a receiving institution from the receiving party; running the multi-level security authorization of the resource distribution document upon indication of the resource distribution document being received; and posting the resource distribution document to the receiving party based on authorization of the multi-level security authorization.

In some embodiments, the multi-level security authorization comprises: receiving the resource distribution document and reviewing information on a face of the resource distribution document; scanning the encrypted scannable code and comparing coded information to the information on the face of the resource distribution document; extracting from storage information about the device used by the user to create the resource distribution document and confirm the device is an approved device for creating a resource distribution document, wherein the user pre-determines approved devices and approved device locations; and confirming the face of the resource distribution document matches the digital photo taken at generation of the resource distribution document.

In some embodiments, the invention further comprises providing the digital photo of the resource distribution document to the user, receiving party, and receiving institution for reconciliation of account information associated with a distribution of the resources.

In some embodiments, the invention further comprises providing, upon receive the indication that the resource distribution document was presented to the receiving institution from the receiving party, the receiving institution with decryption applications for decrypting the encrypted scannable code.

In some embodiments, encrypting the user input into an encrypted scannable code that is imprinted on the generated digital version of the resource distribution document, further comprises generating a scannable QR code for the receiving institution.

In some embodiments, presenting the generated digital version of the resource distribution document to the user via the interface, further comprises allowing the user to print a physical copy of the resource distribution document to provide to the receiving party. In some embodiments, presenting the generated digital version of the resource distribution document to the user via the interface, further comprises allowing the user to digitally communicate the resource distribution document to provide to the receiving party.

In some embodiments, the resource distribution document comprises a document that transfers funds from an account associated with the user to a receiving party.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "transaction" or "resource distribution" refers to any communication between a user and the financial institution or other entity monitoring the user's activities to transfer funds for the purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

In some embodiments, a "resource distribution document" as used herein may refer to any paper or digital document that may transfer or exchange resources, such as funds, across individuals or entities. Resource distribution documents may include checks, certified checks, automated clearing house, contract, or the like.

In some embodiments, an "entity" may be a financial institution or third party merchant. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity. In other embodiments, an entity may not be a financial institution. In still other embodiments, the entity may be the merchant itself. In some embodiments, the "user" may be a user (e.g., an account holder).

Embodiments of the invention are directed to systems, methods and computer program products for generating digital resource distribution documents with multi-level security factoring requirements for authorization and distribution of resources via the document.

In some embodiments, the invention allows a user to print checks or other resource documents from a home network securely. As such, the invention does away with sets of paper checks. In this way, the system links to a user's online or mobile application and allows a user to generate a paper check on one of those platforms. The platform requires authentication onto the platform for secure generation of the check. The user may input the amount, payee, and the like into the system and the system may generate the check.

Furthermore, the user can input various parameters around the check, such as a time frame until expiration, or the like. Furthermore, the system generates a photo of the completed check and parameters. This photo may be used to reconcile the check at the receiving financial institution to ensure the check has not be tampered with in any way.

The photo is a digital generated image that will contain at least two levels of security. First, a quick response code (QR) that provides encrypted details about the details of the payment such as for example from who, to who, amount, reason, date of remittance, date to remit by, and the like. The second level of security will be hidden from the receiving party, this will include the device the user issuing the check has authorized. For example, the system may only allow digitally generated checks from a user's home computer, active mobile device, and/or the like. Furthermore, the system may add any additional restrictions about the ISP used, mobile carrier used, proximity from my home-safe location where the device issued the user's digital check, and the like. This will assist in misappropriation protection and prevention based on using public access devices or cloned devices across the global from misappropriation to be the user issuing a check. Furthermore, the system may additionally add limits, velocity, and recipients of checks to only registered individuals, amounts less than X dollars, or no more than X amount of checks generated within a time period. These restrictions can be learned behavior of the system based on past check writing and check issuance history of the user.

In some embodiments, the image can then be transmitted to any resource distribution entity or financial institution based on ACH or wire transactions digitally. Cross entity transfers can use the digitally encrypted data to cross check the paper or digital version presented by the check remitter. These digital checks can furthermore be used for items such as payroll checks, insurance claim disbursements and other recurring or repeating issuing periods.

In some embodiments, the invention provides multi-level payer and payee security factoring authentication for fund transferring. Paper resource distribution documents have limited amount of multi-factor authentication. Thus, a need exists for an enhanced authentication and security measures for multi-factor paper resource distribution document authentication. The system authenticates a user into a portal, such as an online or mobile banking portal. The system allows the user to input a payee, an amount, a date, a time limitation for depositing, and the like into the portal. The portal may generate a digital or printable version of the resource distribution document, such as a check. Encoded within the check may include a time limitation for depositing the check, the device IP address associated with the device the user utilized to generate the resource distribution document and the like. Upon a payee receiving the document, the payee may attempt to cash or otherwise deposit the resource distribution document. The financial institution receiving the document will confirm that the user was authorized to generate a document from the device, the payee is the correct payee, and the like. Furthermore, the document will have an encrypted encoded version of the information, such as the payee, amount, and the like. The receiving financial institution may be able to confirm the payee and the amount matching to the encoded data to confirm no misappropriation.

Figure 1:
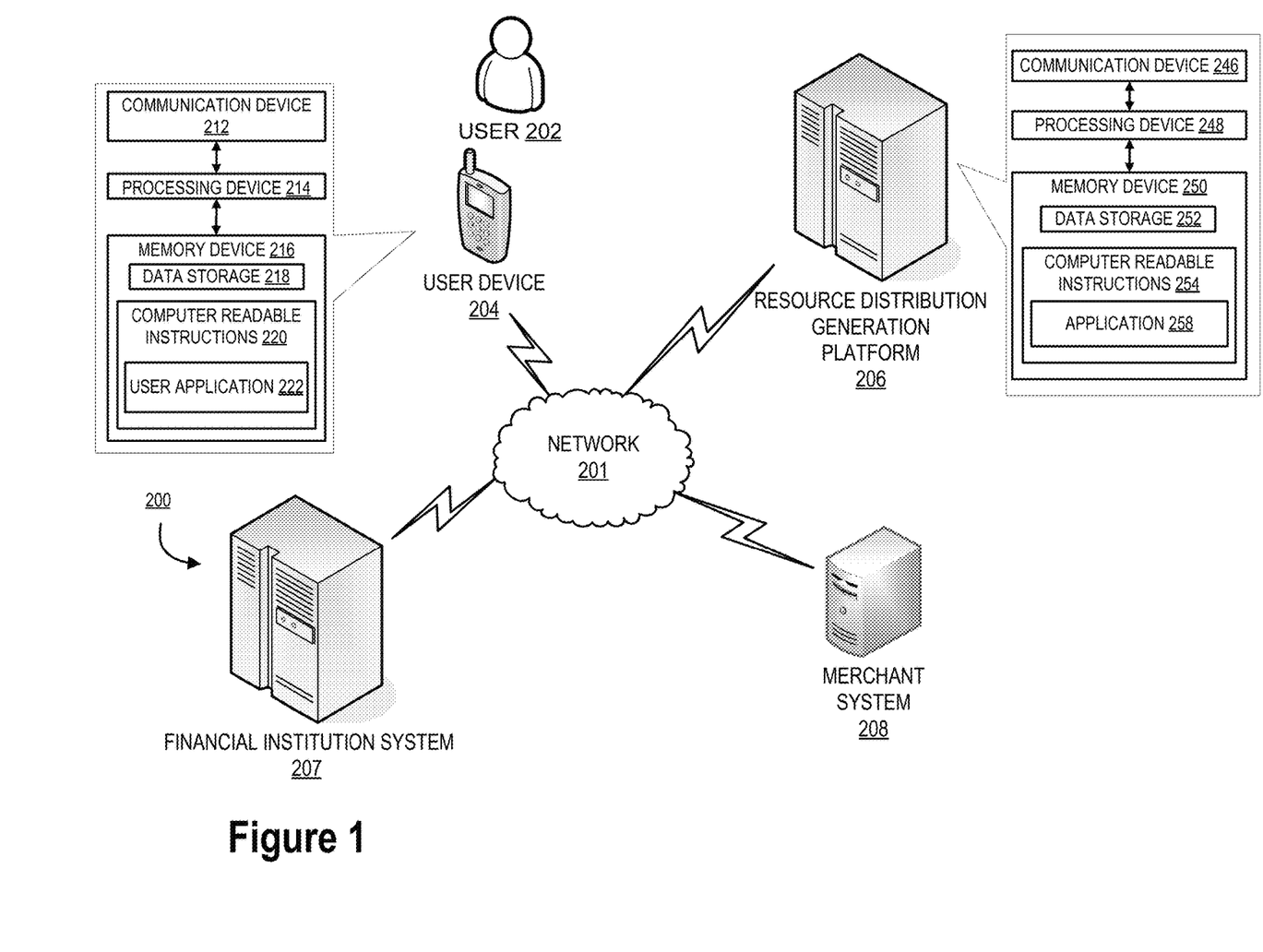
FIG. 1 illustrates a multi-level security authorization system environment, in accordance with embodiments of the present invention.

FIG. 1 illustrates a multi-level security authorization system environment 200, in accordance with embodiments of the present invention. FIG. 1 provides the system environment 200 for which the distributive network system with specialized data feeds associated with resource distribution. FIG. 1 provides a unique system that includes specialized servers and system communicably linked across a distributive network of nodes required to perform the functions of a multi-level security authorization for resource distribution. As illustrated in FIG. 1, the merchant system 208 is operatively coupled, via a network 201 to the user device 204, financial institution system 207, and to the resource distribution generation platform 206. In this way, the merchant system 208 can send information to and receive information from the user device 204, financial institution system 207, and the resource distribution generation platform 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual that is drafting a resource distribution document to another individual or merchant. As such, the user 202 is transferring funds or resources to another individual or merchant via the resource distribution generation platform 206. In some embodiments, the user 202 has a user device, such as a mobile phone, tablet, computer, or the like. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the resource distribution generation platform 206, the merchant system 208, and the financial institution system 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to authenticate into a portal, input resource distribution document information, and digitally communicate the resource distribution document.

As further illustrated in FIG. 1, the resource distribution generation platform 206 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the merchant system 208, the financial institution system 207, and the user device 204. As such, the communication device 246 generally comprises a modem, server, or other device for communicating with other devices on the network 201.

As further illustrated in FIG. 1, the resource distribution generation platform 206 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the resource distribution generation platform 206 the memory device 250 stores an application 258. Furthermore, the resource distribution generation platform 206, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more merchant system 208, financial institution system 207, and/or user device 204.

As illustrated in FIG. 1, the financial institution system 207 is connected to the merchant system 208, user device 204, and resource distribution generation platform 206. The financial institution system 207 has the same or similar components as described above with respect to the user device 204 and the resource distribution generation platform 206. While only one financial institution system 207 is illustrated in FIG. 1, it is understood that multiple financial institution system 207 may make up the system environment 200. The financial institution system 207 may be associated with one or more entities, such as resource providing machines, product providers, service providers, resource allocators, and the like. In this way, the financial institution system 207 may be associated with any third party merchant, financial institution, or the like that the user 202 may transact with.

As illustrated in FIG. 1, the merchant system 208 is connected to the financial institution system 207, user device 204, and resource distribution generation platform 206. In other embodiments, the merchant system 208 may be a third party system separate from the resource distribution generation platform 206. The merchant system 208 has the same or similar components as described above with respect to the user device 204 and the resource distribution generation platform 206. The merchant system 208 may be associated with an individual, merchant, entity, or the like that may be receiving a resource distribution from the user 202. While only one merchant system 208 is illustrated in FIG. 1, it is understood that multiple merchant system 208 may make up the system environment 200.

It is understood that the servers, systems, and devices described herein illustrate one embodiment of the invention. It is further understood that one or more of the servers, systems, and devices can be combined in other embodiments and still function in the same or similar way as the embodiments described herein. The merchant system 208 may generally include a processing device communicably coupled to devices as a memory device, output devices, input devices, a network interface, a power source, one or more chips, and the like. The merchant system 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the merchant system 208 described herein.

Figure 2:
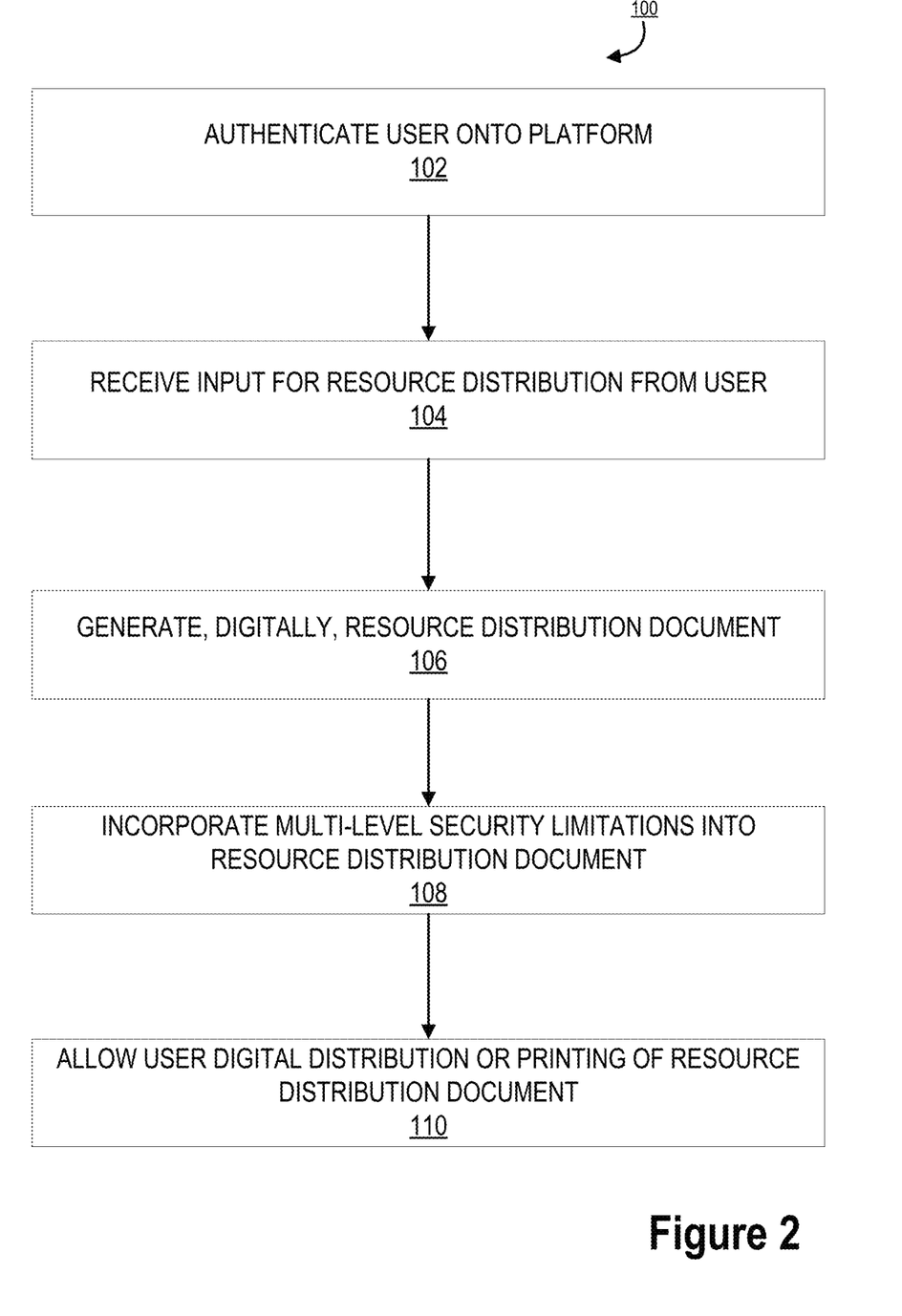
FIG. 2 is a flowchart illustrating resource distribution document authentication and digital generation, in accordance with embodiments of the present invention.

FIG. 2 illustrates resource distribution document authentication and digital generation 100, in accordance with embodiments of the present invention. As illustrated in block 102, the process 100 is initiated by authenticating a user onto a platform. In this way, the user may have a platform application loaded onto his/her mobile device. The platform application may be a mobile banking application, resource application, or the like. The platform may be associated with a financial institution and illustrate the user accounts and funds associated with each account. In this way, the user may authenticate using a username and password, biometric scan, or the like in order to gain access to the portal for review of the user accounts and funds associated therewith.

Furthermore, the system may integrate into the platform to allow for resource distribution via the system through network portals associated with the platform. In this way, the system may integrate code into the platform and utilize the platform functionality in order to initiate and deploy resource distribution using multi-level secure authorization. As such, the system integrates into platform applications, such as third party entity ran platforms or the like, and utilizes platform architecture to allow for resource distribution document generation and deployment.

Next, as illustrated in block 104, the process 100 continues by receiving input for resource distribution from the user. In this way, once the user has authenticated into the platform, the user may be presented with options from the system via an interface, for inputting information into the user interface for generation of a resource distribution document. This information may include a payee, date of generation, amount, signature authorization, expiration date for posting, and the like.

As illustrated in block 106, the process 100 continues by generating, digitally, the resource distribution document. In this way, once the user requests to generate a resource distribution document and inputs the required information into the interface associated with the platform, the system may generate a digital version of a resource distribution document. The resource distribution document generated, as illustrated in block 108 the system incorporates multi-level security limitations into the resource distribution document. In this way, the required authentication to log onto the platform is a level of security associated with the multi-level security limitations. In some embodiments, the system generates a photo of the completed resource distribution document and parameters. This photo may be stored within the system for the end recipient to review for reconciliation in order to ensure that the resource distribution document was not be tampered with in any way. In some embodiments, the system generates a quick response code (QR) on the resource distribution document that provides encrypted details about the details of the payment such as for example from who, to who, amount, reason, date of remittance, date to remit by, and the like. In some embodiments, one of the multi-level security limitations may be hidden from the receiving party. In this way, the system may encode non-visible information about the device the user utilized to generate the resource distribution document. The device may be required to be an authorized device for the generation of the resource distribution document and the device information may be encoded within the generated document for review by the financial institution posting the resource distribution. For example, the system may only allow digitally generated checks from a user's home computer, active mobile device, and/or the like. Furthermore, the system may add any additional restrictions about the ISP used, mobile carrier used, proximity from my home-safe location where the device issued the user's digital check, and the like. This will assist in misappropriation protection and prevention based on using public access devices or cloned devices across the global from misappropriation to be the user issuing a check. Furthermore, the system may additionally add limits, velocity, and recipients of checks to only registered individuals, amounts less than X dollars, or no more than X amount of checks generated within a time period. These restrictions can be learned behavior of the system based on past check writing and check issuance history of the user.

Next, as illustrated in block 110, the process 100 continues by allowing distribution of the generated resource document. In some embodiments, the resource distribution document may be distributed to the receiver, payee, or the like digitally. In this way, the system may, utilizing platform network integration, transmit the resource distribution document to a payee via email, person-to-person linkage, secure network channel, text or SMS message, or the like. The payee may receive the resource distribution document digitally and be able to post the funds associated with the resource distribution document to his/her account. In other embodiments, the system allows the user to print out the resource distribution document and physically provide the resource distribution document to the recipient, payee, or the like for the payee to physically deposit the resource distribution document at his/her desired financial institution.

Figure 3:
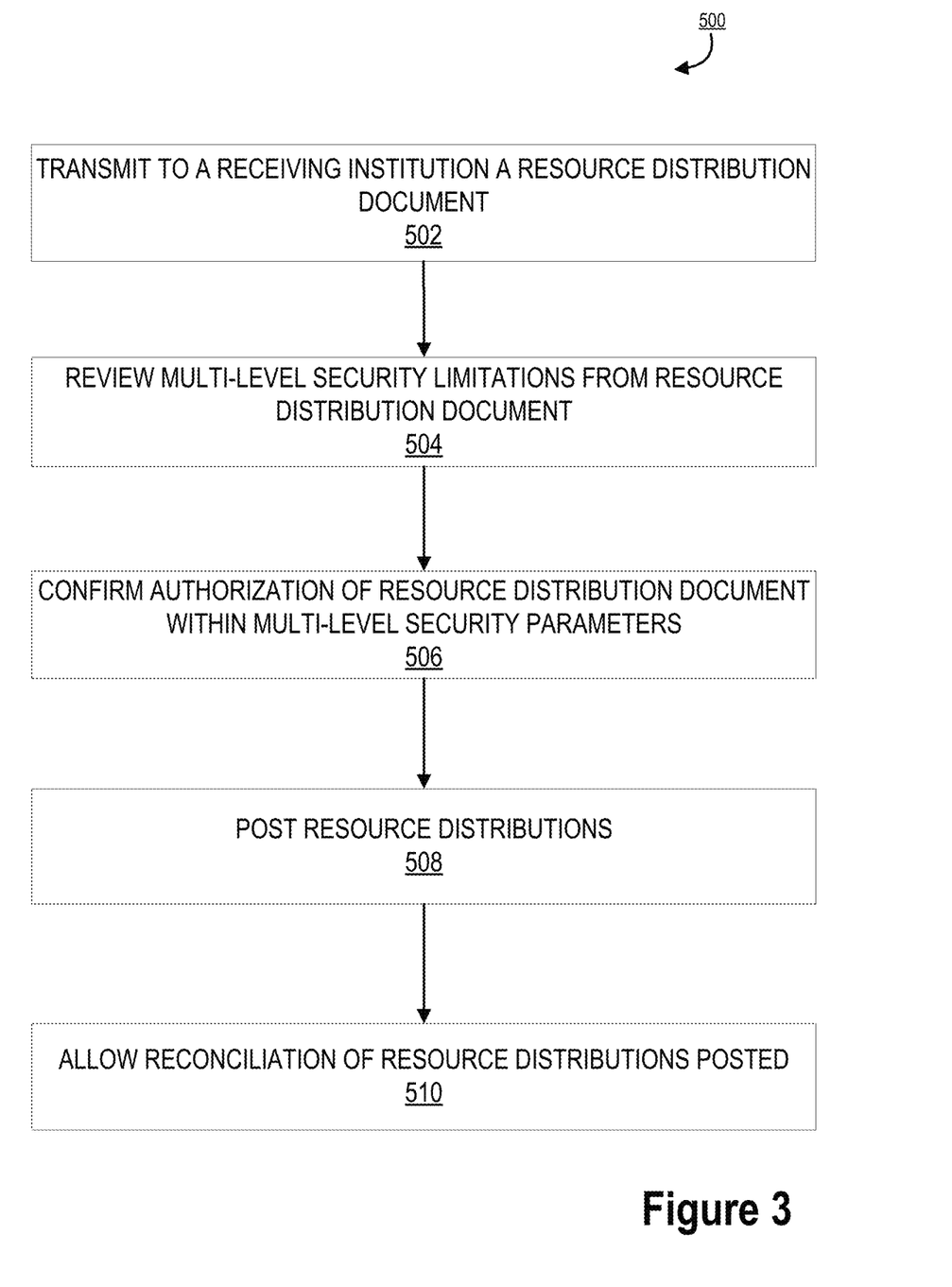
FIG. 3 is a flowchart illustrating multi-level security authorization for deployment and posting of resource distribution document, in accordance with embodiments of the present invention.

FIG. 3 illustrates multi-level security authorization for deployment and posting of resource distribution document 500, in accordance with embodiments of the present invention. Once the user has logged into the platform, inputted the information for generation of the resource distribution document, the system has generated the document, and the resource distribution document has been deployed, digitally or physically, to a recipient, the recipient may provide the resource distribution document to a financial institution, entity, or other receiving institution to transfer funds from the user to the recipient.

As illustrated in block 502, the process 500 is initiated by the payee recipient transmitting the resource distribution document to a receiving institution. The receiving institution may be a financial institution, third party entity, or the like capable of receiving and processing resource distribution documents such as checks or the like for depositing and reconciliation.

Next, as illustrated in block 504, the process 500 continues by providing the receiving institution with tools necessary to review the multi-level security limitations from the resource distribution document. In this way, the system may provide the receiving institution with encryption keys, location trackers, data reading capabilities, origination photos, and verification data for extracting the multi-level security limitations attached to the resource distribution document.

The receiving institution may review the multi-level security limitations. The multi-level security limitations are further illustrated with respect to FIG. 6. The receiving institution may review the encrypted code within or on the resource distribution document. This encrypted code holds information about whom the resource distribution document was made out to as payee, the date, the amount, the account, a reason, date needed to remit by, and the like. The receiving institution, using system provided decryption data may decrypt the code and identify the information about the resource distribution document. This information may be compared to the information written or clearly displayed on the resource distribution document. The resource distribution document may be remitted upon identification of a complete match of the data visible on the resource distribution document and the data within the encrypted code associated with the resource distribution document. Upon identification of a discrepancy, the receiving institution is instructed by the system to deny the transaction associated with the resource distribution document. Furthermore, the system may provide the receiving institution with a photo or digital photo of the originally generated resource distribution document for the receiving institution to compare and confirm.

Next, as illustrated in block 506, the process 500 continues by confirming the authorization of the resource distribution document as being within the multi-level security parameters outlined by the system and/or the user. In this way, the receiving entity confirms the multi-level security with the system to allow for authorization of the resource distribution document. This includes confirming the user authorization into the platform for drafting the resource distribution document, confirming the device the user used to access the platform to generate the resource distribution document as an authorized device, confirming the encrypted data matches the visible data on the resource distribution document, and confirming the photo generated by the system matches the visible data on the resource distribution document.

Next, as illustrated in block 508, the process 500 continues by posting the resource distribution document. In this way, the receiving entity may cash or otherwise deposit funds associated with the resource distribution document into the payee account. The system may also provide a link to a photo of the resource distribution document on a portal associated with the payee and user for subsequent reconciliation. As illustrated in block 510, the process 500 is completed by generating a photo of the digital resource distribution document and allowing access to that photo for reconciliation of the resource distribution document posted for the user and the payee.

Figure 4:
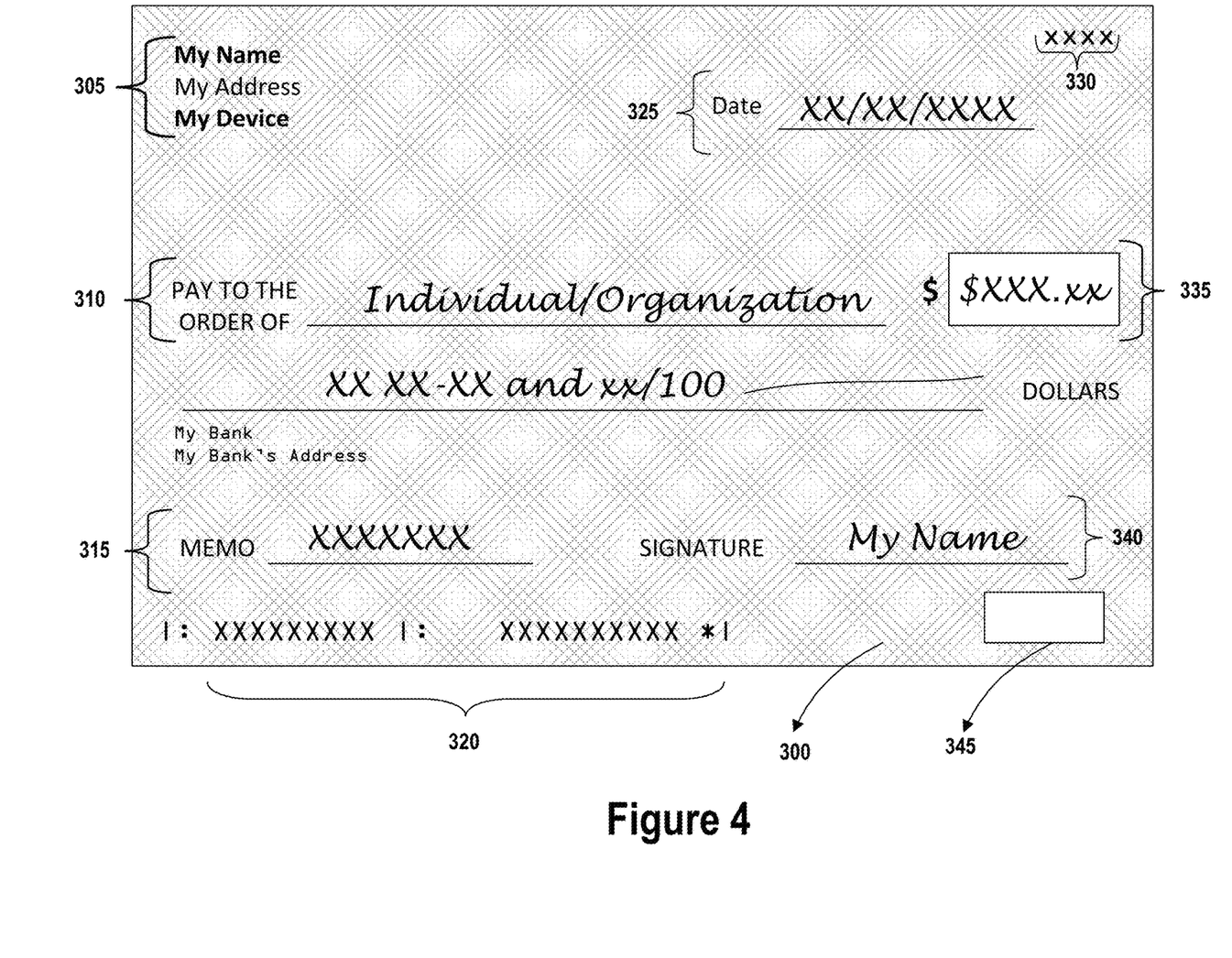
FIG. 4 illustrates a representation of one embodiment of a resource distribution document, in accordance with embodiments of the present invention.

FIG. 4 illustrates a representation of one embodiment of a resource distribution document 300, in accordance with embodiments of the present invention. The resource distribution document illustrated in FIG. 4 is a check. However, one will appreciate that any resource distribution document, financial document, or the like may be provided. In some embodiments, the system may generate a digital version of the check 300 to distribute to a payee. In some embodiments, the system may allow a user to print a physical version of the digital version of the check 300 to distribute to the payee. In yet other embodiments, a paper or printed physical version of the resource distribution document may be generated for reconciliation by the user, receiving entity, payee, or other financial institutions.

The image of check 300 may comprise an image of the entire check, a thumbnail version of the image of the check, individual pieces of check information, all or some portion of the front of the check, all or some portion of the back of the check, or the like. Check 300 comprises check information, wherein the check information comprises contact information 305, the payee 310, the memo description 315, the account number and routing number 320 associated with the appropriate user or user account, the date 325, the check number 330, the amount of the check 335, the signature 340, or the like. In some embodiments, the check information may comprise text. In other embodiments, the check information may comprise an image. A capture device may capture an image of the check 300 and transmit the image to a system of a financial institution via a network. The system may collect the check information from the check 300 and store the check information in a datastore as metadata. In some embodiments, the pieces of check information may be stored in the datastore individually. In other embodiments, multiple pieces of check information may be stored in the datastore together.

Furthermore, the check 300 may comprise a security encoded region 345. This region may include a QR code or other encrypted coding that encrypts the data the user originally inputted onto the resource distribution document. In this way, the system may be able to visualize the information on the resource distribution document and identify if any item has been misappropriated based on the encrypted coding data compared to the visible data on the resource distribution document. The security encoded region 345 includes encrypted code holds information about whom the resource distribution document was made out to as payee, the date, the amount, the account, a reason, date needed to remit by, and the like. The receiving institution, using system provided decryption data may decrypt the code and identify the information about the resource distribution document. This information may be compared to the information written or clearly displayed on the resource distribution document.

In the illustrated embodiment, the check corresponds to the entire front portion of a check, but it will be understood that the check may also correspond to individual pieces of check information, portions of a check, or the like. The check, in some embodiments, includes the format of certain types of checks associated with a bank, a merchant, an account holder, types of checks, style of checks, check manufacturer, and so forth.

Figure 5:
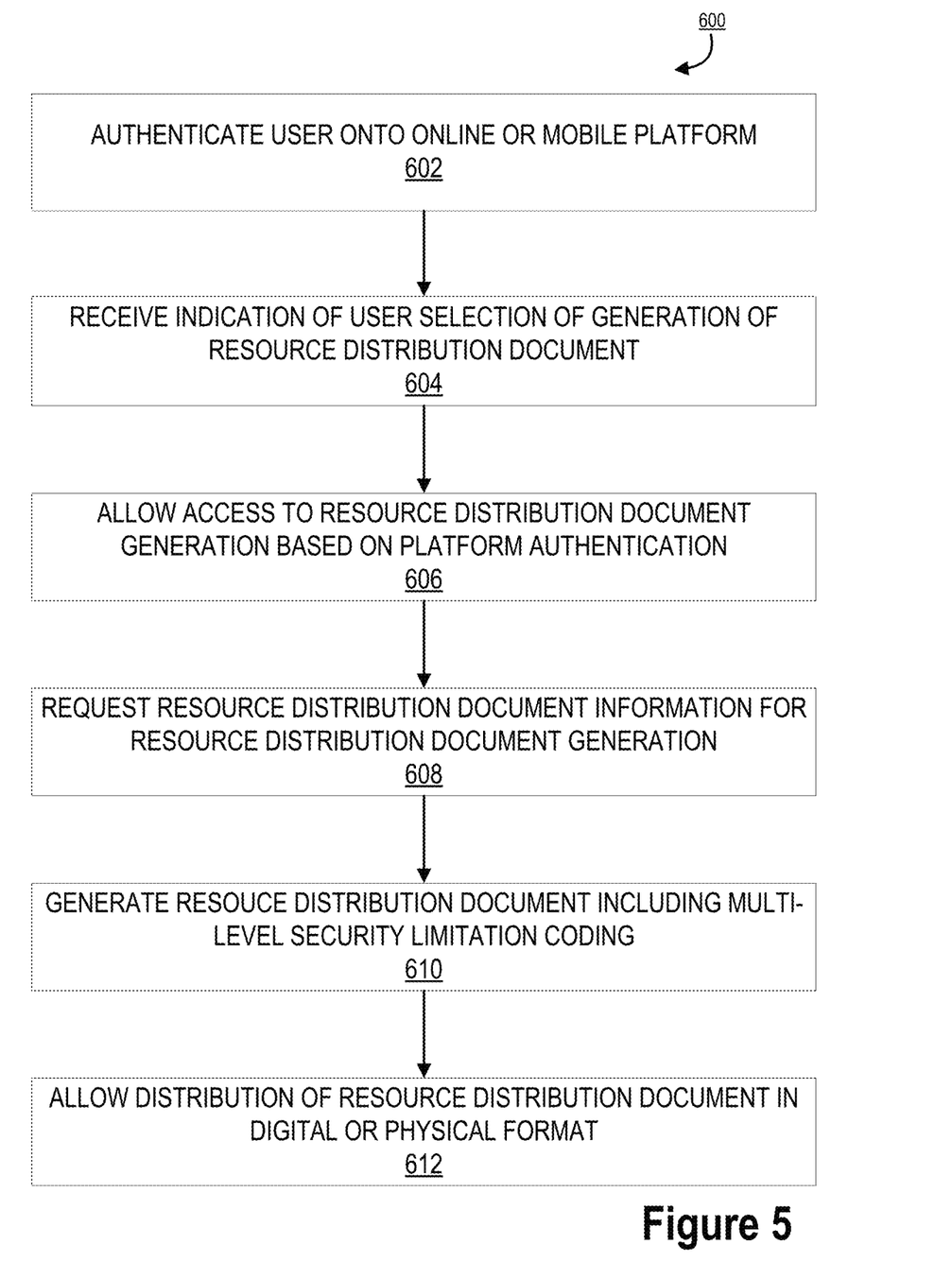
FIG. 5 is a flowchart illustrating authentication and generation of a resource distribution document with multi-level security authorization requirements, in accordance with embodiments of the present invention.

FIG. 5 illustrates the authentication and generation of a resource distribution document with multi-level security authorization requirements 600, in accordance with embodiments of the present invention. As illustrated in block 602, the process 600 is initiated by authenticating a user onto an online or mobile platform from a user device. In some embodiments, the online or mobile platform will require authentication such as a username/passcode, username/biometrics or the like authentication. The platform may be an existing platform such as a financial institution application or the like.

Upon authentication into the platform, the user may select to digitally create a resource document. In this way, as illustrated in block 604, the process 600 continues by receiving an indication that the user selected to generate a resource distribution document via the platform. The system may allow the user access to resource distribution document generation upon receiving platform authentication, as illustrated in block 606. In this way, the system may allow a user to gain access to an interface to input information for generation of a resource distribution document using platform architecture. As such, the system integrates into the platform for presentation and generation of the resource distribution document generation interface to the user.

Next, as illustrated in block 608, the system may request specific resource distribution document information from the user for the resource distribution document generation. This information may include the payee, an amount, an account of the user, a reason for payment, date of remittance, date to remit by, payee account information, and the like.

Once the user inputs the information onto the interface, the system may generate the resource distribution document based on the information provided. Furthermore, as illustrated in block 610, the system may also generate the resource distribution document and include the multi-level security limitation coding. The multi-level security limitation coding includes coding of information on the digital resource distribution document and storing information within the system and associate that information with the resource distribution document generated. In this way, ensuring accuracy of the resource distribution document and preventing misappropriation of the generated resource distribution document. In some embodiments, the coding of information on the resource distribution document includes the generation of a QR code or the like on the visual representation of the digital resource distribution document. In some embodiments, the system may store a photo of the generated resource distribution document for reconciliation and comparison by a receiving entity.

Next, as illustrated in block 612, the process 600 is completed by allowing the distribution of the resource distribution document in digital or physical format to the user for further distribution to the recipient or payee. In some embodiments, the user may distribute the resource distribution document to the recipient electronically, such as via text message, person-to-person message, email, or the like. In some embodiments, the user may distribute the resource distribution document to the recipient physically, such as via hand delivery, mail, or the like distribution of a paper version of the resource distribution document.

Figure 6:
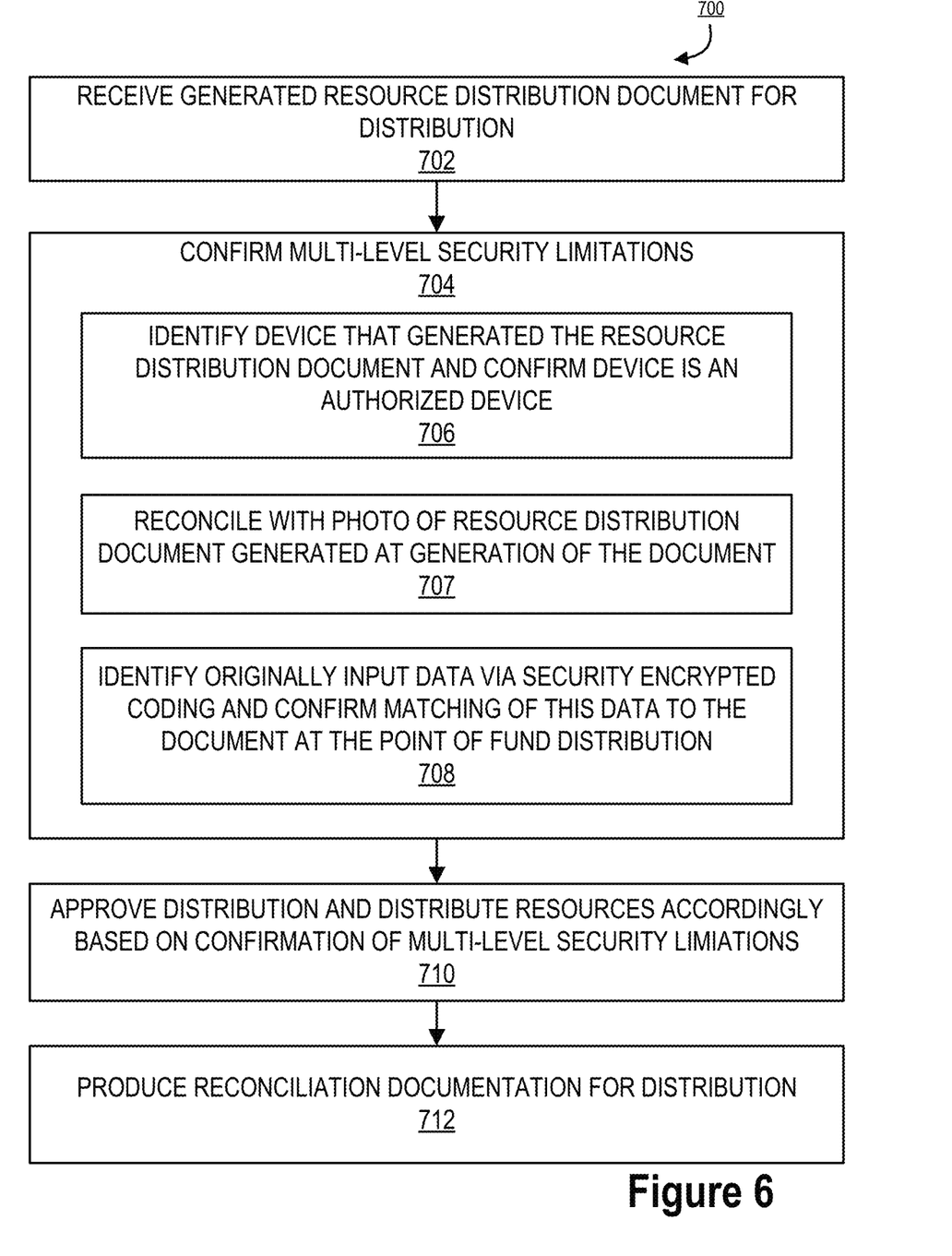
FIG. 6 illustrates multi-level security factors for authorization and posting of resource distribution documents, in accordance with embodiments of the present invention.

FIG. 6 illustrates multi-level security factors for authorization and posting of resource distribution documents 700, in accordance with embodiments of the present invention. As illustrated in block 702, the process 700 is initiated by receiving a generated resource distribution document for distribution and posting to a payee account at a receiving institution, such as a financial institution, or the like. In some embodiments, the resource distribution document may be sent to the receiving institution electronically. In other embodiments, the resource distribution document may be sent to the receiving institution in a physical format.

The receiving institution may link to the system to confirm the multi-level security limitations associated with the received resource distribution document, as illustrated in block 704. These security limitations may include, in some embodiments, identifying the device that generated the resource distribution document and confirming the device is an authorized device, as illustrated in block 706; reconciling the resource distribution document with a photo generated at the generation of the document, as illustrated in block 708; and/or identifying originally inputted data via a security encrypted coding on the resource distribution document and confirming that this data matches to the document at the point of fund distribution, as illustrated in block 708.

In some embodiments, identifying the device that generated the resource distribution document and confirming the device is an authorized device, as illustrated in block 706, illustrates one of the one or more multi-level security limitations. This level of security is hidden from the receiving party, this will include the device the user issuing the check has authorized. For example, the system may only allow digitally generated checks from a user's home computer, active mobile device, and/or the like. In this way, the system may recognize approved devices for the user to generate the resource distribution document from and only approve the transfer of funds associated with that resource distribution document if the resource distribution document was generated from an approved device of the user. Furthermore, the system may add any additional restrictions about the ISP used, mobile carrier used, proximity from my home-safe location where the device issued the user's digital check, and the like.

In some embodiments, reconciling the resource distribution document with a photo generated at the generation of the document, as illustrated in block 708, illustrates one of the one or more multi-level security limitations. In this way, once the user generates the resource distribution document, the system may take a digital image of the resource distribution document and the information associated with the generated resource distribution document. This information may include the payee, the date, date of remittance, amount, and the like. The image may be stored at the system and produced upon indication that the resource distribution document was received at a receiving institution. Upon that indication, the system may direct a copy of the digital image to the receiving institution so that the receiving institution may compare the digital image to the one received for distribution. This ensures that any physical manipulation of the resource distribution document is identified prior to the transferring of funds across accounts is performed.

In some embodiments, identifying originally inputted data via a security encrypted coding on the resource distribution document and confirming that this data matches to the document at the point of fund distribution, as illustrated in block 708, illustrates one of the one or more multi-level security limitations. The encrypted coding on the resource distribution document may include a quick response code (QR) that provides encrypted details about the details of the payment such as for example from who, to who, amount, reason, date of remittance, date to remit by, and the like. In this way, the receiving institution may be provided with technology for reading the encrypted data imprinted on the resource distribution document. Upon scanning of the encrypted data QR code, the receiving institution may be able to review the originally set payee, amount, reason, date of remittance, date to remit by, and the like. This will provide instant security for any misappropriation that may have occurred between the generation of the resource distribution document and the distribution of the resource distribution document. As such, this will assist in misappropriation protection and prevention based on using public access devices or cloned devices across the global from misappropriation to be the user issuing a check. Furthermore, the system may additionally add limits, velocity, and recipients of checks to only registered individuals, amounts less than X dollars, or no more than X amount of checks generated within a time period. These restrictions can be learned behavior of the system based on past check writing and check issuance history of the user.

Once the system, through communication with the receiving institution, such as a financial institution or the like, as confirmed the multi-level security limitations from block 704, the process 700 continues by authorizing approval for distribution of the resources according to the resource distribution document and distributing the resources, as illustrated in block 710. In this way, a payee, recipient, or receiving party may provide the resource distribution document to a receiving institution, such as a financial institution, in order to cash the resource distribution document or otherwise disperse the funds from the resource distribution document to their account.

As illustrated in block 712, the process 700 is completed by producing a reconciliation documentation associated with the distribution of funds from the resource distribution document. As such, the system may generate and post to a financial institution platform, a digital image of the resource distribution document, such that the user and the payee may be able to select the image and review the resource distribution document for account reconciliation. In some embodiments, the image can then be transmitted to any resource distribution entity or financial institution based on ACH or wire transactions digitally. Cross entity transfers can use the digitally encrypted data to cross check the paper or digital version presented by the check remitter.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generating resource distribution documents with multi-level security authorization, the system comprising:
  a memory device with computer-readable program code stored thereon;
  a communication device;
  a processing device operatively coupled to the memory device and the communication device, wherein the processing device is configured to execute the computer-readable program code to:
    identify a user authorization for access onto a platform application and identifying a device the user is utilizing to access the platform application, wherein the platform application is a mobile or online platform;
    allow user input into an interface portal within the platform application for resource distribution document generation;
    generate a digital version of the resource distribution document based on the user input;
    imprint an encrypted scannable code on the generated digital version of the resource distribution document that includes the user input;
    present the generated digital version of the resource distribution document to the user via the interface for distribution to a receiving party;
    receive an indication that the resource distribution document was presented to a receiving institution from the receiving party;
    run the multi-level security authorization of the resource distribution document upon indication of the resource distribution document being received, wherein running the multi-level security authorization comprises:
      receiving the resource distribution document and reviewing information on a face of the resource distribution document;
      scanning the encrypted scannable code and comparing coded information to the information on the face of the resource distribution document;
      extracting from storage information about the device used by the user to create the resource distribution document and confirm the device is an approved device for creating resource distribution documents, wherein the user pre-determines approved devices and approved device locations; and
      confirming the face of the resource distribution document matches a photo taken at generation of the resource distribution document; and
    post the resource distribution document to the receiving party based on authorization of the multi-level security authorization.

2. The system of claim 1, wherein the processing device is configured to execute the computer-readable program code to provide a photo of the resource distribution document to the user, receiving party, and receiving institution for reconciliation of account information associated with a distribution of the resources.

3. The system of claim 1, wherein the processing device is configured to execute the computer-readable program code to provide, upon receiving the indication that the resource distribution document was presented to the receiving institution from the receiving party, the receiving institution with decryption applications for decrypting the encrypted scannable code.

4. The system of claim 1, wherein presenting the generated digital version of the resource distribution document to the user via the interface, further comprises allowing the user to print a physical copy of the resource distribution document to provide to the receiving party.

5. The system of claim 1, wherein presenting the generated digital version of the resource distribution document to the user via the interface, further comprises allowing the user to digitally communicate the resource distribution document to provide to the receiving party.

6. The system of claim 1, wherein the resource distribution document comprises a document that transfers funds from an account associated with the user to the receiving party.

7. A computer program product for generating resource distribution documents with multi-level security authorization, the computer program product comprising a non-transitory computer-readable storage medium having computer-executable instructions to:
  identify a user authorization for access onto a platform application and identifying a device the user is utilizing to access the platform application, wherein the platform application is a mobile or online platform;
  allow user input into an interface portal within the platform application for resource distribution document generation;
  generate a digital version of the resource distribution document based on the user input;
  imprint an encrypted scannable code on the generated digital version of the resource distribution document that includes the user input;
  present the generated digital version of the resource distribution document to the user via the interface for distribution to a receiving party;
  receive an indication that the resource distribution document was presented to a receiving institution from the receiving party;
  run the multi-level security authorization of the resource distribution document upon indication of the resource distribution document being received, wherein running the multi-level security authorization comprises:
    receiving the resource distribution document and reviewing information on a face of the resource distribution document;
    scanning the encrypted scannable code and comparing coded information to the information on the face of the resource distribution document;
    extracting from storage information about the device used by the user to create the resource distribution document and confirm the device is an approved device for creating resource distribution documents, wherein the user pre-determines approved devices and approved device locations; and
    confirming the face of the resource distribution document matches a photo taken at generation of the resource distribution document; and
  post the resource distribution document to the receiving party based on authorization of the multi-level security authorization.

8. The computer program product of claim 7, further comprising providing a photo of the resource distribution document to the user, receiving party, and receiving institution for reconciliation of account information associated with a distribution of the resources.

9. The computer program product of claim 7, further comprising providing, upon receiving the indication that the resource distribution document was presented to the receiving institution from the receiving party, the receiving institution with decryption applications for decrypting the encrypted scannable code.

10. The computer program product of claim 7, wherein presenting the generated digital version of the resource distribution document to the user via the interface, further comprises allowing the user to print a physical copy of the resource distribution document to provide to the receiving party.

11. The computer program product of claim 7, wherein presenting the generated digital version of the resource distribution document to the user via the interface, further comprises allowing the user to digitally communicate the resource distribution document to provide to the receiving party.

12. The computer program product of claim 7, wherein the resource distribution document comprises a document that transfers funds from an account associated with the user to the receiving party.

13. A computer-implemented method for generating resource distribution documents with multi-level security authorization, the method comprising:
  identifying a user authorization for access onto a platform application and identifying a device the user is utilizing to access the platform application, wherein the platform application is a mobile or online platform;
  allowing user input into an interface portal within the platform application for resource distribution document generation;
  generating a digital version of the resource distribution document based on the user input;
  imprinting an encrypted scannable code on the generated digital version of the resource distribution document that includes the user input;
  presenting the generated digital version of the resource distribution document to the user via the interface for distribution to a receiving party;
  receiving an indication that the resource distribution document was presented to a receiving institution from the receiving party;
  running the multi-level security authorization of the resource distribution document upon indication of the resource distribution document being received, wherein running the multi-level security authorization comprises:
    receiving the resource distribution document and reviewing information on a face of the resource distribution document;
    scanning the encrypted scannable code and comparing coded information to the information on the face of the resource distribution document;
    extracting from storage information about the device used by the user to create the resource distribution document and confirm the device is an approved device for creating resource distribution documents, wherein the user pre-determines approved devices and approved device locations; and confirming the face of the resource distribution document matches a photo taken at generation of the resource distribution document; and posting the resource distribution document to the receiving party based on authorization of the multi-level security authorization.

14. The computer-implemented method of claim 13, further comprising providing a photo of the resource distribution document to the user, receiving party, and receiving institution for reconciliation of account information associated with a distribution of the resources.

* * * * *